United States Patent [19]
Carnewal et al.

[11] Patent Number: 4,863,415
[45] Date of Patent: Sep. 5, 1989

[54] COMBINE HARVESTER CLEANING APPARATUS

[75] Inventors: Jose A. C. L. Carnewal, Eeklo; Wilfried E. D. Gunst, Koekelare; Willy C. Hollevoet, Torhout; Marc R. M. Jonckheere, Lichtervelde, all of Belgium

[73] Assignee: Ford New Holland, Inc., New Holland, Pa.

[21] Appl. No.: 196,173

[22] Filed: May 19, 1988

[51] Int. Cl.⁴ .................................................. A01F 12/44
[52] U.S. Cl. ...................................... 460/101; 460/97; 56/16.5; 209/234
[58] Field of Search ................................ 56/14.6, 16.5; 130/24 DR, 25, 26, 27 R, 27 T; 209/234 X, 235

[56] References Cited

U.S. PATENT DOCUMENTS

| | | | |
|---|---|---|---|
| 3,593,719 | 7/1971 | Ashton | 130/26 |
| 4,100,720 | 7/1978 | Carnewal et al. | 56/14.6 |
| 4,401,128 | 8/1983 | Fisher | 130/26 |
| 4,770,190 | 9/1988 | Barnett | 130/24 |

Primary Examiner—John Weiss
Attorney, Agent, or Firm—Larry W. Miller; Frank A. Seemar; Darrell F. Marquette

[57] ABSTRACT

A combine harvester, having threshing and separating means for threshing and separating crop material and a cleaning apparatus disposed to receive threshed and separated grain from said treshing and separating means and being operable to clean unwanted residue from the threshed and separated grain is disclosed wherein the cleaning apparatus, including at least a pair of cleaning sieves arranged to be oscillated generally back-and-forth for moving threshed and separated grain therealong while permitting the passage of cleaned grain therethrough, and further including a cleaning fan operable to direct a cleaning air blast to the cleaning sieves for urging unwanted residue to the threshed and separated grain into an airborne state for discharge from the combine harvester, is provided with an agitator positioned between the cleaning sieves. During operation, the cleaning sieves are moved relative to the agitator for removing straw particles that otherwise might tend to stick to one or both sieves in a generally upright orientation.

11 Claims, 3 Drawing Sheets

COMBINE HARVESTER CLEANING APPARATUS

BACKGROUND OF THE INVENTION

The present invention relates generally to combine harvesters and, more particularly, to the cleaning apparatus thereof with a view to improving substantially its grain cleaning characteristics especially when operating in grain crops with tough straw. The invention is particularly advantageous when used in combination with a so-called single-acting cleaning shoe, i.e. a cleaning apparatus comprising at least a pair of juxtaposed cleaning sieves which are oscillated back-and-forth in unison.

It has been experienced that in such cleaning apparatuses, straw pieces tend to bridge and get stuck between the juxtaposed sieves. This phenomenon lies at the origin of sieve plugging resulting in sieve overloading, reduced cleaning efficiency, reduced cleaning capacity, a dirty grain sample (i.e. pieces of straw in the grain-tank) and increased grain losses; all of which, of course, are not acceptable.

While this tendency for straw pieces to get stuck between juxtaposed sieves is not new, it has become critical and problematic only during recent years. The explanation therefore apparently can be found in the newly applied plant growing techniques and the introduction of new crop varieties in grain farming. With these new plant growing techniques are meant the widespread combined usage of increased nitrogen fertilization and growth regulators. These new techniques together with said new crop varieties result in the crop having much tougher straw at the harvesting time due to the fact that, on the one hand, the crop ears are ripe well before the crop stems and, on the other hand, harvesting is started as soon as the ears have a sufficient degree of ripeness.

The foregoing problem, in most circumstances, may be overcome by the provision of a so-called double-acting cleaning shoe in the combine harvester. In such cleaning shoes the sieves are oscillated in opposite directions whereby straw particles have a lesser chance to get stuck therebetween. However, such a double-acting cleaning apparatus is more complicated in design and more expensive to manufacture. Accordingly, it would be desireable to provide a solution to the straw briding problem usable in conjunction with a single-acting cleaning shoe.

SUMMARY OF THE INVENTION

Accordingly, it is an object of the present invention to overcome the aforementioned sieve plugging problem in a less expensive, and simpler, though nevertheless efficient manner.

According to the present invention, a combine harvester is provided which comprises:
threshing and separating means for threshing and separating crop material and
a cleaning apparatus disposed to receive threshed and separated grain from the threshing and separating means and being operable to clean unwanted residue from the threshed and separated grain; said cleaning apparatus including:
(a) at least a pair of cleaning sieves disposed the one above the other and arranged to be oscillated generally back-and-forth for moving threshed and separated grain therealong while permitting the passage of cleaned grain therethrough, and
(b) a cleaning fan operable to direct a cleaning air blast to the cleaning sieves for urging unwanted residue in the threshed and separated grain into an airborne state for discharge from the combine harvester,
and which is characterised in that an agitator means is provided between both sieves; said sieves and said agitator means, during operation, being relatively moved with respect to each other for removing straw particles that otherwise might tend to stick to one or both sieves in a generally upright orientation.

Preferably, the agitator means is removably mounted between said pair of sieves. These sieves may be oscillated back-and-forth in opposite directions with respect to one another. However, as already mentioned, the invention is particularly useful when combined with a single acting cleaning apparatus wherein the sieves are oscillated back-and-forth in unison. The agitator means also may be oscillated back-and-forth relative to the chassis of the combine harvester and out of phase with the oscillation of the cleaning sieves. However, preferably the agitator means is held generally stationary relative to the combine chassis, whereby, during operation there nevertheless still is relative motion between the sieves and the agitator means in view of the oscillatory movement of the sieves.

Preferably the agitator means is formed by a generally rectangular subframe carrying a plurality of transverse, fore-and-aft spaced apart members. This fore-and-aft spacing at the maximum equals the length of the stroke of the sieves in case the agitator means is held stationary.

BRIEF DESCRIPTION OF THE DRAWINGS

A combine harvester embodying the present invention will now be described in greater detail, by way of example, with reference to the accompanying drawings, in which.

DETAILED DESCRIPTION OF THE PREFERRED EMBODIMENT

Figure 1:
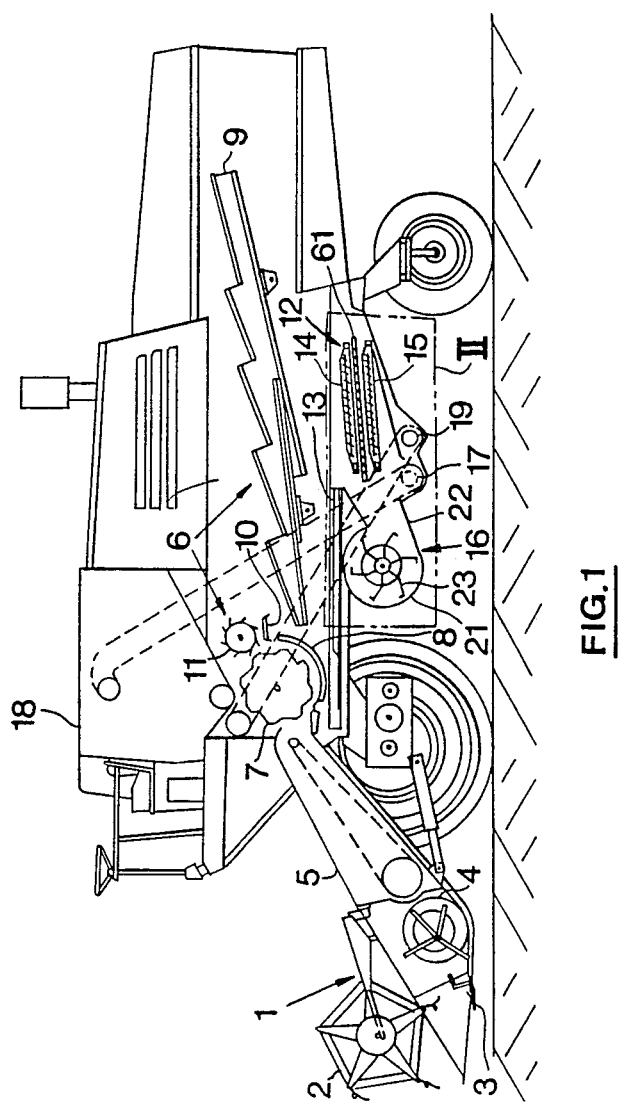
FIG. 1 is a schematic elevational view lengthwise of the combine harvester.

Referring first to FIG. 1, the combine harvester illustrated is of conventional design employing straw walkers and, as such, the components thereof are well known. However, the invention is equally applicable to the so-called rotary combines such as the axial flow type combines. The terms "forward", "rearward", "left", "right", etc. used in connection with the combine harvester and/or components thereof are determined with reference to the direction of forward operative travel but should not be considered as limiting. Also, the terms "grain", "straw" and "tailings" are used principally throughout this specification for convenience and it should be understood that these terms equally are not intended to be limiting. Thus "grain" refers to that part of the crop material which is threshed and separated from the discardable part of the crop material which is referred to as "straw". Incompletely threshed ears are referred to as "tailings".

For ease of reference, a brief general description of the combine harvester shown in FIG. 1 will be given. This combine harvester comprises a header 1 having a reel 2 which sweeps crop material towards the cutterbar 3. Cut crop material is consolidated centrally of the machine by an auger 4 and then elevated by an elevator 5 to threshing and separating means indicated generally at 6 and basically consisting of a threshing section including a threshing cylinder 7 cooperable with a threshing concave 8, a straw beater 11 and associated beater grate 10 and a separating section including straw walkers 9. Most of the grain is separated from the straw by the threshing cylinder 7 and associated threshing concave 8. Straw material issuing from the threshing means 7, 8 is subjected to the action of a straw beater 11 and passes therefrom to the straw walkers 9 which effect further separation of grain from the remainder of the crop material. Grain which is separated by the threshing and separating means 6 falls onto the grain pan 13 of the cleaning apparatus 12 which further also comprises a pair of sieves 14, 15 disposed the one above the other and a cleaning fan 16.

The grain pan 13 and the sieves 14, 15 are oscillated generally back-and-forth for transporting threshed and separated grain from the grain pan 13 to the cleaning sieves 14, 15 on the one hand and for moving said grain along said sieves 14, 15 on the other hand while permitting the passage of cleaned grain by gravity through these sieves 14, 15. The grain on the sieves 14, 15 is subjected to a cleaning action by the fan 16 which serves to blow air through said sieves 14, 15 to remove chaff and other impurities such as dust from the grain by making this material airborne for discharge from the machine. Clean grain eventually falls to a clean grain auger 17 in a clean grain auger trough 24 and is subsequently transferred therefrom to a grain tank 18. Tailings eventually fall to a tailings auger 19 in a tailings auger trough 25 and are subsequently recycled through the threshing and separating apparatus 6 for renewed threshing and separating action.

Figure 2:
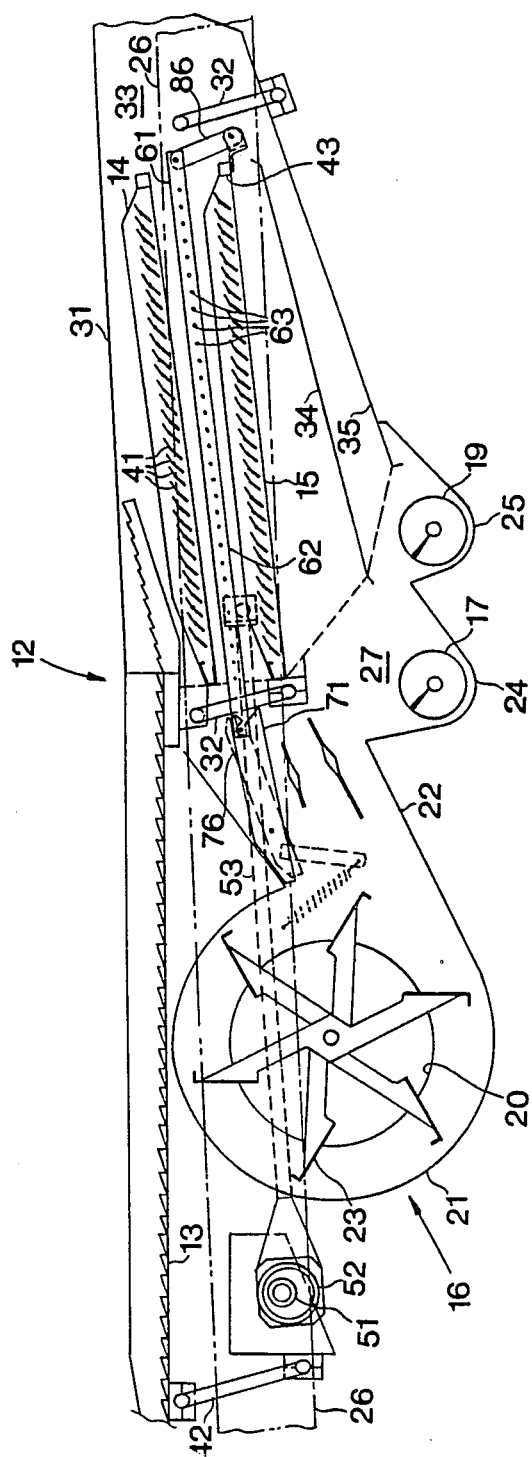
FIG. 2 shows the portion of the machine indicated at II in FIG. 1 to a larger scale.
Figures 3, 4:
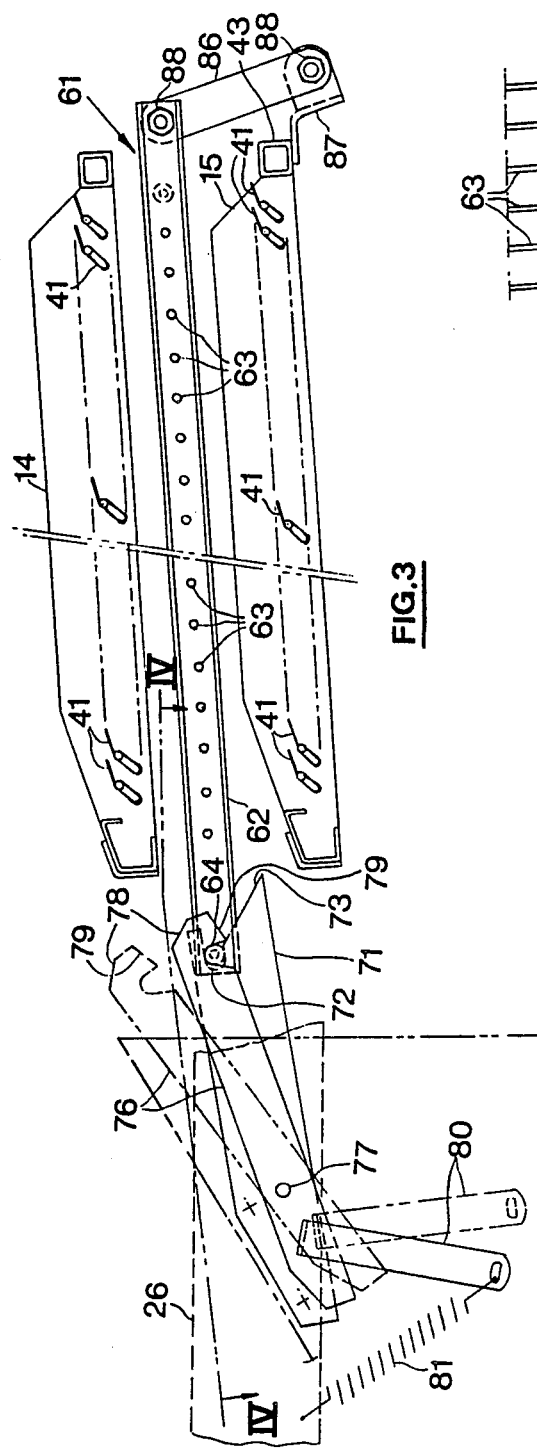
FIG. 3 schematically illustrates, on a further enlarged scale, the mounting of the agitator means according to the invention between a pair of cleaning sieves.
FIG. 4 shows a partial sectional view taken along the lines IV—IV in FIG. 3.

Referring now to FIG. 2, the cleaning apparatus 12 can be seen in greater detail. The cleaning fan structure 16 typically comprises a generally cylindrical body 21 with opposite inlets 20 and communicating with a transverse rearwardly facing outlet duct 22 and which is fixedly mounted on the combine chassis 26. A fan rotor 23 is rotatably mounted within the cylindrical body 21. The auger troughs 24, 25 are fixedly coupled to the fan housing outlet duct 22 and to the combine chassis 26 and form part of a stationary boxlike structure which includes the opposing side walls 27 (FIGS. 2 and 4).

Typically, the cleaning apparatus 12 also includes a cleaning shoe or subframe 31 which is mounted for generally fore-and-aft oscillatory movement onto the combine harvester chassis 26 through the intermediary of front and rear pairs of mounting links or arms 32. This cleaning shoe subframe 31 typically comprises opposite side walls 33 and a pair of inclined floor members 34, 35; the one disposed above the other and with the upper one 34 leading toward the clean grain auger trough 24 and the lower one 35 leading to the tailings auger trough 25. The cleaning shoe side walls 33 extend within the boxlike structure in part defined by the side walls 27 coupled to the auger troughs 24, 25. The cleaning sieves 14, 15 are removably mounted within the cleaning shoe subframe 31 through the intermediary of supports (not shown) attached to the sidewalls 33. These cleaning sieves 14, 15 thus are movable in unison with the cleaning shoe to which they are fixedly coupled.

The cleaning apparatus as shown and described so far is of the so-called single-acting type to the extent that both sieves 14, 15 are oscillated back-and-forth in unison while that, in contrast therewith, in so-called double-acting cleaning apparatuses, the individual cleaning sieves are oscillated back-and-forth in opposite directions. The instant invention is particularly useful in combination with so-called single acting cleaning devices although the application of the invention in a so-called double acting cleaning apparatus equally may be advantageous although these advantages are less evident, as will become clear further on.

The cleaning sieves 14, 15 usually are disposed the one above the other and are inclined slightly upwardly from front to rear of the machine. The "mesh" of each of the sieves 14, 15 may be provided by a plurality of transverse louvres 41 each stamped out of sheet metal and having a main body portion, rearwardly extending fingers and a forwardly extending portion which is angled downwardly with respect to the main body portion. The louvres 41 are juxtaposed such that the fingers of one overlie the body portion and rear portion of the next louvre 41, hence forming a "mesh" through which clean grain may fall. The "meshes" of the sieves 14, 15 are adjustable independently of each other so as to adapt them to the crop which is being harvested. While the sieves 14, 15 are preferably of the adjustable type, one or both may be replaced by "fixed" sieves having an invariable "mesh". Also more than two sieves may be juxtaposed the one above the other.

The grain pan 13 is coupled at its rearward end to the cleaning shoe 31 and is supported at its forward end on the combine chassis 26 by a pair of mounting arms 42 which permit oscillatory movement of said grain pan 13 relative to the chassis 26 in unison with the cleaning shoe 31. The grain pan 13 is conventional in shape and comprises a corrugated floor.

Oscillatory movement, during operation, is imparted to the grain pan 13 and the cleaning shoe 31 supporting the cleaning sieves 14, 15 by eccentric drive means including a transverse drive shaft 51 supporting at its opposite ends eccentric members 52. A conrod 53 is connected at one of its ends to each one of said eccentric members 52 via a bearing means and is coupled at the other one of its ends to a corresponding side wall 33 of the cleaning shoe 31. During operation, the shaft 51 receives rotative power from a power source (not shown) on the harvester and thus oscillates the grain pan 13 and cleaning sieves 14, 15 generally back-and-forth.

The cleaning apparatus 12 described so far is conventional and during its operation, threshed and separated grain, which is received on the upper cleaning sieve 14, is caused to move therealong in the rearward direction thereof as a result of the oscillatory movement of said sieve. Simultaneously as the threshed and separated grain is moved longitudinally of the upper cleaning sieve 14, clean grain together with some impurities is permitted continuously to fall through said upper sieve 14 and onto the lower sieve 15 where the same operation is repeated, i.e. material is caused to progress lengthwise of the lower sieve 15 while permitting clean grain to finally fall therethrough and onto the upper floor member 34 of the cleaning shoe 31; said clean grain being led by said upper floor member 34 toward the clean grain auger 17 in the clean grain auger trough 24. Tailings, which are too large to fall through the "mesh" of the sieves 14, 15, are dropped onto the lower floor member 35 at the rearward end of the sieves 14, 15 for conveyance to the tailings auger 19 in the tailings auger trough 25.

During this operation, the cleaning fan 16 directs a cleaning air blast in a rearward and upward direction toward the sieves 14, 15. This air blast passes underneath these sieves 14, 15; inbetween both sieves 14, 15 and from below through said sieves 14, 15 and is operable to urge unwanted residue in the threshed and separated grain (i.e. chaff, straw particles, dust etc.) into an airborne state for discharge from the machine.

The threshed and separated grain received on the grain pan 13 of the cleaning apparatus 12 also comprises pieces of straw of varying lengths. These pieces of straw normally should be discharged from the machine at the rear of the cleaning sieves 14, 15. However, some of these pieces tend to fall through the upper sieve 14, which, by itself, would not present a problem. However, some straw particles tend to stick between the louvres 41 of the sieves 14, 15. This is particularly so when these straw particles are sufficiently long to bridge the vertical spacing between the upper and lower sieves 14, 15 as they then may be caught between the louvres 41 of both the upper and lower sieves 14, 15 whereby they may be quite firmly held in this obstructing position and consequently the oscillatory movement of the sieves 14, 15 often is insufficient for shaking these straw particles loose.

It will be clear to one skilled in the art that, as soon as some straw particles are stuck in this position, they obstruct the flow of material lengthwise of the sieves 14, 15 and give rise to a build-up of other material, inclusive other straw particles on the surface of the sieves 14, 15. This, in turn, soon results in a partial or complete plugging of the sieves 14, 15 and thus greatly reduces the efficiency and capacity of the cleaning apparatus 12 and causes a dirty grain sample and grain losses to occur, which is not at all acceptable.

The risks for the foregoing problem to occur are particularly inherent to the so-called single-acting cleaning apparatuses, which otherwise are simple in design and therefore inexpensive to manufacture. The reason therefore is that the cleaning sieves in such an apparatus are oscillated back-and-forth in unison whereby it thus is more likely that the long pieces of straw can get stuck between the louvres of both the upper and lower sieves. In a double acting cleaning apparatus there is less tendency for straw pieces to get stuck between both said sieves simply because of the opposite oscillatory movement of both sieves. Yet the problem nevertheless occasionally also may occur even with said double-acting cleaning apparatuses.

The foregoing problem has aggravated very seriously in recent years due to the widespread combined usage of increased nitrogen fertilization and growth regulators on the one hand and the introduction of new crop varieties on the other hand; both of which have resulted in the crop having much tougher straw at the harvesting time due a.o. to the facts that the ears are ripe well before the crop stems and harvesting starts as soon as the ears are ripe.

According to the present invention, this problem is cured or at least reduced very substantially by the installation of an agitator means 61 inbetween both sieves 14, 15 in a manner so that, during operation, the sieves 14, 15 on the one hand and the agitator means 61 on the other hand are relatively moved for removing straw particles that may tend to stick to one or both sieves 14, 15 in a generally upright orientation. This agitator means 61 is particularly useful for removing straw pieces which tend to bridge between both sieves 14, 15 because said agitator means 61 either fracture these straw pieces whereafter they fall loose, or just shake these pieces loose. These loose straw pieces are further processed in the cleaning apparatus 12 in the normal way for ultimate discharge rearwardly of the cleaning apparatus 12. This agitator means 61 is also useful for shaking loose shorter pieces of straw which tend to stick between the louvres 41 of the upper sieve 14 and to hang downwardly therefrom without actually reaching toward the lower sieve 15.

The aforementioned agitator means 61 may be mounted for oscillatory movement out of phase with the oscillatory movement of the cleaning sieves 14, 15; i.e. the agitator means 61 and the cleaning sieves 14, 15 may be oscillated back-and-forth in opposite directions. This combination may be particularly useful when the cleaning apparatus is of the single acting type. It will be obvious that in such a combination suitable drive means for the agitator means must be provided.

However, the agitator means 61 preferably is mounted stationary relative to the combine harvester chassis 26 whereby, by virtue of the cleaning sieves 14, 15, in operation, being oscillated back-and-forth relative to said chassis 26, there is still a relative movement between said agitator means 61 and said sieves 14, 15. In this combination with a stationary agitator means 61, clearly there is no need for a separate drive means for the agitator means 61 and the agitator means 61 itself can be of a lighter construction. Hence, this arrangement is much simplier in design and less expensive in manufacture and therefore is preferred over the combination with an indepently movable agitator means.

With reference to FIGS. 3 and 4, the preferred embodiment of the invention will now be described in greater detail. The agitator means 61 basically consist of a rectangular subframe 62 having a plurality of transversely extending members 63 such as wire elements which are spaced apart in the longitudinal direction of the machine over a distance which is substantially equal to or less than the stroke of the oscillatory movement of the sieves 14, 15. This agitator means 61 extends between the upper and lower sieves 14, 15 across substantially the full length thereof and the wire spacing thereof is sufficient so that the wire members 63, during operation, do not obstruct to any noticeable degree the passage of clean grain from the upper sieve 14 to the lower sieve 15. Should the lower sieve 15 be longer than the upper sieve or, should the sieves 14, 15 be longitudinally offset relative to each other to some degree, then the agitator means 61 preferably should have a fore-and-aft dimension which generally corresponds to the fore-and-aft dimension of the vertically overlapping sieve sections and should be positioned inbetween said overlapping sieve sections. Alternatively and in case the sieves 14, 15 would be longitudinally offset relative to each other to some extent, the agitator means 61 may have a longitudinal dimension corresponding to the fore-and-aft dimension of the upper sieve 14 and be positioned vertically therebelow. In the latter case the agitator means 61 thus would have a fore-and-aft dimension which exceeds the length of the vertical sieve overlap.

The fore-and-aft wire spacing of the agitator means may be larger than specified above in case the sieves 14, 15 and the agitator means 61 are oscillated in opposite directions. In this case the wire spacing preferably at the maximum generally equals the sum of the lengths of the strokes of both the sieves 14, 15 and the agitator means 61 itself.

For mounting the agitator means 61 between the sieves 14, 15, supports 71 have been secured to the opposite side walls of the cleaning fan outlet duct 22. These supports 71 extend generally rearwardly and have rearwardly facing recessed seats 72 for receiving a transverse forward mounting member 64 of the agitator subframe 62. A slanted lead-in surface 73 also is provided on each one of the supports 1 for facilitating the assembly of the agitator means 61 within the machine.

A latch member 76 is pivotally mounted at 77 on each one of the supports 71 and comprises a hooked end 78 which is cooperable with the mounting member 64 when positioned in the corresponding seat 72 for firmly holding the agitator means 61 in position. Each latch member 76 equally comprises a slanted lead-in surface 79 for, together with a spring-loading 81 of said latch member 76, facilitating the assembly of the agitator means 61 within the machine. A stop (not shown) cooperates with each latch member 76 for, when the agitator means 61 is not installed inbetween the pair of sieves 14, 15, positioning said latch member 76 relative to the corresponding support 71 to facilitate the entry of the transverse mounting member 64 between said support 71 and said latch member 76 when installing the agitator means 61. Each latch member 76 further also comprises a handle 80 which extends outside the cleaning fan outlet duct 22 for enabling the operator to unlatch the latch member 76 for permitting removal of the agitator means 61. The spring 81 providing the aforementioned spring loading also acts upon said handle 80 and is coupled at its other end to the chassis 26.

Adjacent the rearward end, the agitator means 61 is supported via a pair of transversely spaced apart rocking arms 86 on the lower sieve 15. Each rocking arm 86 is pivotally coupled on the one hand, at its upper end to the agitator subframe 62 and, on the other hand, at its lower end to the rear transverse beam 43 of the lower sieve 15 via a mounting member 87 fixedly secured to said transverse beam 43. Alternatively the rear end of the agitator means 61 also may be suspended from the upper sieve 14 by means of similar rocking arms 86 rather than being mounted upon said lower sieve 15 through the intermediary of said rocking arms 86. At least one of these pivotal mountings of each one of the rocking arms 86 is readily detachable to facilitate the removal of the agitator means 61 in case this would be desirable or necessary. This pivotal mounting of the rocking arms 86 on the agitator means 61 and the lower sieve 15 preferably is realized by using bolts, nuts and lock nuts 88 as is conventional. The rocking arms 86 are placed substantially parallel to the cleaning shoe mounting arms 32 to minimize vertical movement of the agitator means 61 during operation of the cleaning apparatus 12.

From what precedes, it will be clear that the agitator means 61 can be inserted between the sieves 14, 15 from the rear of the combine harvester. For installing the agitator means 61, it first is placed on top of the lower sieve 15 whereafter it is pushed in the forward direction until the forward mounting member 64 of the agitator subframe 62 engages the slanted lead-in surfaces 73. Further forward movement of the agitator means 61 causes the mounting member 64 to engage the slanted lead-in surfaces 79 of the latch members 76 whereby these latch members 76 are lifted against the spring-loading thereof and to permit said mounting member 64 to enter the seats 72. Once the mounting member 64 is positioned within the seats 72, the latch members 76 automatically return to their latching position by virtue of the spring-loading thereof.

After the forward end of the agitator means 61 is brought in position, it is still necessary to couple the rear end of said agitator means 61 to either one of the pairs of sieves 14, 15 through the intermediary of the rocking arms 86. This is easily done by means of using bolts, nuts and lock nuts 88.

For removing the agitator means 61 from the combine harvester, obviously the foregoing steps are reversed after the latch members 76 are lifted by manipulating the handles 80 and locked in their retracted positions by locking members (not shown) of any conventional type.

It will be appreciated that, during operation, the agitator means 61 is held stationary in the general fore-and-aft direction relative to the combine chassis 26 by virtue of this agitator means 61 being firmly coupled at its forward end to the stationary supports 71 on the cleaning fan outlet duct 22. The rear mounting of the agitator means 61 by means of the rocking arms 86 permits an oscillatory, generally fore-and-aft movement of the cleaning shoe 31 and of the sieves 14, 15 mounted therein, relative to the agitator means 61 which, as already mentioned, is held generally stationary in said direction. As a matter of fact, the forward coupling of the agitator means 61 to the supports 71 indeed excludes any fore-and-aft movement of this agitator means 61 but does not exclude any up-and-down pivotal movement of the rear end of said agitator means 61 around the axis of the seats 72, holding the forward mounting member 64 of the agitator frame 62. In practice, the fore-and-aft oscillatory movement of the cleaning shoe 31 results in a small up-and-down oscillatory movement of the agitator frame 61 which however is neglectable especially because the rocking arms 86 are provided generally parallel to the rear mounting arms 32 for the cleaning shoe 31.

Any pieces of straw which tend to bridge between the upper and lower sieves 14, 15 and which tend to stick therebetween, are agitated by the agitator means 61 by virtue of the relative motion between said agitator means 61 and said sieves 14, 15. Thereby these straw particles either are shaken loose and subsequently discharged or otherwise, are fractured and detached from the sieves 14, 15 whereafter the pieces thereof again are discharged. Similarly, shorter pieces of straw which also tend to get stuck in a generally upright orientation between the louvres 41 of just one sieve 14, 15 equally are shaken loose by said agitator means 61 when contacted thereby. As a consequence the agitator means 61 effectively substantially reduces or even totally eliminates the risks for sieve plugging as a result of straw particles sticking between the louvres 41 of the sieves 14, 15.

From what precedes, it also will be clear that the agitator means 61 according to the instant invention not only easily can be installed on new combine harvesters but instead, also easily can be retro-fitted on existing machines with minimal changes to these existing machines. Particularly significant in this respect is that no drive means for the agitator means according to the preferred embodiment of the invention are required. This retro-fitting possibility is particularly advantageous to the extent that, the problem addressed by the instant invention has become critical during the last couple of years only because of the newly applied plant growing techniques in farming and to which older existing machines were not adapted.

Also, the instant invention provides a relatively inexpensive solution to the problem as described above and thus obviates the need for providing the more expensive and complicated double acting cleaning apparatus which, in many circumstances, equally would overcome said problem for the reasons as already explained herebefore. Should the agitator means not be required for certain crops and crop conditions, it easily and quickly can be removed from the machine. The preferred embodiment of the invention further also lends itself particularly well for offering the agitator means as an option rather than as standard equipment. Also, should the cleaning apparatus comprise more than two juxtaposed cleaning sieves, it is quite clear that an agitator means according to the invention may be installed between each pair of adjacent sieves.

It will be understood that changes in the details, materials, steps and arrangements of parts, which have been described and illustrated to explain the nature of the invention, will occur to and may be made by those skilled in the art upon a reading of this disclosure within the principles and scope of the invention. The foregoing description already illustrates several embodiments of the invention; however, concepts, as based upon the description may be employed in still other embodiments without departing from the scope of the invention.

As an example, the rear mounting or rocking arms 86 supporting the agitator means 61 on the lower sieve 15 very well may be replaced by pairs of juxtaposed fore-and-aft supports secured to the side walls 33 of the cleaning shoe 31 and disposed to slideably hold the agitator frame 62 therebetween; said agitator frame 62 further being pivotally coupled at its forward end via links to fixed points on the cleaning fan outlet duct 22. The aforementioned upper for-and-aft supports eventually may be replaced by leaf spring members extending downwardly from the upper sieve 14 and contacting the agitator means 61 for slideably holding it in engagement with the lower fore-and-aft supports Alternatively, the rocking arms 86 also may be replaced by leaf spring mounting members supporting the rear end of the agitator means 61 on the cleaning shoe 31. According to still another alternative arrangement, the agitator means 61 also may be fixedly mounted at its rear edge to the combine harvester frame through the intermediary of mounting members extending through elongated apertures in the cleaning shoe sidewalls 33.

The agitator means 61 as described above also may be replaced by one or more transverse members which are mounted beneath an associated sieve for relative movement lengthwise of said sieve. Alternatively, the agitator means also may be formed by a plurality of transverse bars or wire members which are fixedly mounted between opposed side walls of the combine harvester chassis and which extend through elongated slots in the cleaning shoe side walls to prevent interference of said bars or wire members with the cleaning shoe when the latter is oscillated.

Having thus described the invention, what is claimed is:

1. In a combine harvester having a frame; threshing and: separating means supported on said frame for threshing and separating crop material; and a cleaning apparatus supported from said frame proximate to said threshing and separating means and disposed to receive threshed and separated grain from the threshing and separating means and being operable to clean unwanted residue from the threshed and separated grain, said cleaning apparatus including at least a pair of generally vertically spaced cleaning sieves arranged to be oscillated generally in a fore-and-aft direction for moving threshed and separated grain therealong while permitting the passage of cleaned grain and nonairborne residue therethrough, said cleaning apparatus further including a cleaning fan operable to direct a cleaning air blast to the cleaning sieves for urging at least a portion of unwanted residue in the threshed and separated grain into an airborne state for subsequent discharge from the combine harvester, the improvement comprising:

an agitator means positioned between said pair of cleaning sieves so that said cleaning sieves are movable during operation thereof relative to said agitator means for removing nonairborne residue that otherwise might tend to stick to one or both of said cleaning sieves in a generally upright orientation.

2. The combine harvester according to claim 1 wherein the agitator means is removably supported between said pair of cleaning sieves.

3. The combine harvester according to claim 2 wherein the cleaning sieves are oscillated in unison with respect to one another.

4. The combine harvester according to claim 3 wherein the agitator means is stationarily supported from said frame so that said cleaning sieves are moved relative thereto during operation of said cleaning apparatus.

5. The combine harvester according to claim 4 wherein the cleaning sieves are mounted to have a vertically overlapping fore- and-aft length dimension, said agitator means having a fore-and-aft length dimension at least equal to the vertically overlapping fore-and-aft length dimension of said cleaning sieves.

6. The combine harvester according to claim 4 wherein the agitator means is formed by a generally rectangular subframe carrying a plurality of transversely extending members spaced apart in a fore-and-aft direction.

7. The combine harvester according to claim 6 wherein the fore-and-aft spacing of the transverse members of the agitator means is not greater than the fore-and-aft component of the oscillatory movement of the cleaning sieves.

8. The combine harvester according to claim 7 wherein the agitator means is supported from said frame at one end by stationary supports and is coupled at the opposing end to one of said pair of cleaning sieves by rocking arms pivotally coupled to both said one cleaning sieve and said agitator means.

9. The combine harvester according to claim 8 wherein the stationary supports comprise generally rearwardly facing seats and associated latch members for detachably receiving a forward mounting member of the agitator means.

10. The combine harvester according to claim 9 wherein each said latch member is spring-loaded, each said stationary support and each associated latch member having slanted lead-in surfaces leading toward the corresponding seat, said spring-loading latch members and said slanted lead-in surfaces cooperating to facilitate the assembly of the agitator means within the combine harvester.

11. The combine harvester of claim 10 wherein each said latch member includes a hooked end cooperable with the corresponding seat for firmly holding the forward mounting member of the agitator means within said seat.

* * * * *